UNITED STATES PATENT OFFICE.

ROBERT WAHL, OF CHICAGO, ILLINOIS.

MALTLESS NON-ALCOHOLIC BEVERAGE AND PROCESS OF PRODUCING THE SAME.

1,249,259.      Specification of Letters Patent.      Patented Dec. 4, 1917.

No Drawing.      Application filed March 9, 1916. Serial No. 83,176.

*To all whom it may concern:*

Be it known that I, ROBERT WAHL, a citizen of the United States, residing at Chicago, in the county of Cook and State of Illinois, have invented a new and useful Improvement in Maltless Non-Alcoholic Beverages and Processes of Producing the Same, of which the following is a specification.

My present invention relates to certain new and useful improvements in beverages and processes of producing the same. More particularly I am at present concerned with the production of a palatable and nutritious carbonated beverage obtained by the utilization of the translocation diastase found in bran and the like vegetable material as set forth in my prior applications, Serial No. 49,681 and 58,518. In my prior application first referred to I have disclosed the sources and properties of this translocation diastase and the general procedure to be followed in the technical use of the same, and I have further pointed out the advantageous results flowing from the simultaneous or consecutive actions of this diastase and of the *Bacillus Delbrücki* or lactic acid bacteria on certain classes of material. In my second named application I have set forth and claimed the process of producing a certain dry food product, making use of certain of the principles disclosed in my first-named application. In the present application I shall disclose a specific method of applying the general principles disclosed in my prior applications referred to, together with certain other steps and modes of procedure to produce a maltless, unfermented, alcohol-free, beverage of pleasing flavor, relatively high nutrient value, and healthful physiological action.

In general my new beverage is a carbonated liquid containing upward of 90% and preferably about 94 to 95% of water, and from 5 to 10% of nutritious extracts, including carbohydrates, phosphates, and proteins.

The raw materials from which the beverage is prepared may be, for instance, bran, starch, hops, water, yeast, salt, and carbonic acid gas, and the process of manufacture may be broadly outlined as involving: the production of a lactic acid liquor from bran, the gelatinization of the starch, the mashing of a mixture of bran and gelatinized starch, the hopping of the wort thus obtained, and the carbonization of the final product, the yeast salt, and lactic liquor having been added at various stages of the process.

More particularly the raw materials to be employed may be:

Wheat bran.

This is the preferred source of the translocation diastase. The bran to be employed should be tested as to its diastatic power, which should run from 70 to 100 or 110° Lintner for particularly good specimens. Such bran will yield to the mash about 20 to 30% of extract. As a substitute for the wheat bran various other vegetable products may be employed, as mentioned in my prior applications before referred to.

Starch.

The product known on the market as "Mazam," being a partially gelatinized corn-starch in the form of flakes, and so readily soluble as to yield from 95 to 100% of extract without cooking, is the preferred starchy material employed. Other cereal products in the form of grits, flakes or meal from corn or rice must be thoroughly gelatinized. Any of the well known methods of gelatinization such as those described in the *Wahl-Henius Handybook for Brewing, Malting and the Auxiliary Trades*, may be employed, it being essential to the best results however that the gelatinization be more thorough than is required for ordinary practice. I therefore recommend either prolonged cooking in an ordinary cooker, or the use of a pressure cooker. Potato products such as flakes, meal, flour, or starch are also quite serviceable, being more readily gelatinized than the cereal products, ordinary cooking without pressure here answering.

Coloring matter.

Where a dark colored beverage is desired roasted bran, prepared in the manner set forth in my prior applications is suitable. Sugar coloring may also be used.

Lactic liquor.

Acid liquor of a strength of about 2%, prepared by subjecting a bran mash to the action of *Bacillus Delbrücki* under the conditions set forth in my Patent 1,028,508, June 4, 1912, should be used.

Hops.

Either American (New York State or West Coast) or European (Bohemian, Bavarian, Alsatian or English) hops may be employed; attention being given to the amount of hop bitter acid in the hops. American West Coast or New York State hops, being grown under the influence of polinization, have a higher bitter acid content for this reason.

Yeast.

Thick yeast which may be obtained in lightly pressed condition on the market is used for the sole purpose of improving the taste and adding body and nutritive value to the beverage. Since no fermentation is intended or desired the yeast cells may be dead when used. The yeast is added to a boiling wort and is therefore instantly killed if it be in an active condition, as will later appear.

Water.

A medium hard water of good purity containing about 250 parts per million of calcium sulfate and an equal amount of sodium chlorid is best suited. High temporary hardness due to calcium or magnesium bicarbonate is objectionable and should be corrected by boiling, and settling. A water containing soda or one very soft should receive an addition of about 5 pounds of calcium sulfate or calcium chlorid per 100 barrels in the kettle.

For preparing 50 barrels, or 1250 hectoliters of the finished product the following materials may be used, in the proportions given:

Bran _____ 500–650 lbs. (for a 5¼ to 6% wort).
Roasted bran ____ 25–100 lbs. (according to color desired).
  or
Sugar coloring __ 1 quart to 1 gallon.
Mazam or potato starch _____ 850 pounds.
(2½% acidity.)
Lactic liquor _____ 1 barrel.
Hops _____ 35 pounds.
Thick yeast _____ 37 pounds.
Table salt _____ 5 pounds.
Carbonic acid gas _____ 75 pounds.

Method of procedure.

The entire quantity of bran is doughed in an ordinary cooker with about 20 barrels of water and 6 gallons of lactic liquor, the temperature being kept at 39° R. or about 50° C. for one hour, during which time the bacteria of the lactic liquor are active. The entire quantity of Mazam or other starch (previously gelatinized as described) is then added and the temperature immediately raised to 56° R. or about 70° C. It is important that the time taken to raise the temperature of the mash should be as short as possible, not to exceed 10 minutes. The mash will be held at 70° C. for 45 minutes, at the end of which time an iodin test should show practically no starch, although there will be a strong reddish brown coloration indicative of erythodextrin.

The foregoing operations having been conducted in an ordinary cooker, it is now desirable to run the entire mash into a mashtun provided with a stirrer and a false or strainer bottom, having first covered the latter with boiling hot water, perhaps 5 bbls. If the mash has cooled in transit to the mashtun it should be immediately brought up to 70° C. again, and the stirrer allowed to rotate a few revolutions. The mash is permitted to rest for about 20 minutes and is then tapped below the false bottom and pumped back for about 10 minutes at the end of which time the wort will be only moderately turbid and may be run then into a steam jacketed kettle of the usual form. After the first wort has been run off into the kettle it may be desirable to mash up in which case about 5 to 10 bbls. of water of 60° R. (75° C.) are run through the bottom, the stirrer being rotated meanwhile for a time at least. Sparging is then commenced, the sparging water being about 60° R. (75° C.), and continued until the desired amount of wort is obtained in the kettle, i. e., 50 bbls. As soon as the jacket of the kettle is covered the steam is turned into it and the wort kept at 56° R. until the kettle is full. Opportunity is thus afforded for completion of the diastatic inversion.

When the kettle is full it is immediately brought to a boil and boiled for one-half hour. Ten pounds of hops are then added and boiled for 35 minutes, during the last portion of which period the thick yeast, the salt, and 6 gallons of the lactic liquor are added or up to the point of slight lactic acidity indicated by litmus paper. Ten pounds more of hops is now added, and boiled for 25 minutes. The last and best of the hops, 5 pounds, is then added and the wort immediately run to a hop-jack or other vessel equipped with a strainer bottom. The wort should be run off the hops in the hop-jack in not over 45 minutes and should then be cooled as rapidly as possible and preferably in an atmosphere of $CO_2$ to 0° R., running from the cooler to a settling tub where it is allowed to stand for about 12 hours at the same temperature. After this treatment it is pumped through a loosely packed filter into a cask, the temperature of 0° R. being still maintained, and the balance of the lactic liquor, i. e., 18 gallons, is now added. On the following day the beverage is again filtered, so that the liquid becomes fairly clear, and is run into a pressure cask, ten pounds of dry hops being suspended in a bag from one of the rods in the cask. It is desirable that a chill-proofing enzym, such as bromelin, pepsin, or papaine, preferably the commercial product known as "collupulin," be employed to digest the albuminoids of the beverage, and for this purpose I may add one half of the required amount at this stage of the process.

The beverage is now carbonated in the usual manner, using an excess of $CO_2$ to develop a pressure of about 10 lbs. per square inch above atmospheric in the cask, which pressure is maintained for about two or three days and then slowly reduced to 6 lbs. After having thus absorbed the proper amount of gas the beverage is again filtered and the other half of the "collupulin" added. After allowing it to stand over night, it is ready for bottling and may be run into the filling tanks, being again filtered at this stage unless it is perfectly brilliant.

After bottling the beverage should be pasteurized at a temperature of about 52° R., the bath being brought up to this temperature in about 30 minutes and maintained there for the same length of time. The time heretofore given is for pint bottles. Quart bottles should be kept at 52° R. for not less than 40 minutes. It will be noted that the pasteurization temperature here given is above that used for alcoholic beverages.

The bottled product should be protected from high temperatures in storage and from exposure to strong light. In filling the bottles precautions should be taken to expel the air, which may be done by filling the bottle in such a manner as to surround the bottle neck with a mass of fine bubble-foam, thus displacing the air.

The beverage produced by the foregoing process is, as will be noted from the description of the method of manufacture, entirely free of alcohol and of all malt, or derivatives or extracts of malt, not only as a finished product but at every step of its preparation. It may range in color from the lightest transparent yellow to a deep brown or opaque black, accordingly as a smaller or greater proportion of roasted bran or sugar coloring is employed, and its flavor may likewise be varied, by reducing or increasing the proportions of the ingredients and by modifying the action of the enzyms and bacteria. The specific product produced by the preferred process described I find to be a palatable beverage of good keeping qualities and brilliant color, of some nutritive value, and having no physiological action save that due merely to the carbonated water, sugar, and lactic-acid extracted nutritive substances of the bran.

While I have described in considerable detail one specific process and the beverage produced thereby, it is to be understood that this description is illustrative only and for the purpose of making my invention more clear. I do not regard the invention as limited to any of these specific raw materials mentioned, or to the particular modes of procedure outlined, or to the exact constitution of the resultant beverage, except in so far as each of these limitations appears from the terms of the following claims in which it is my intention to claim all of the novelty inherent in my invention as broadly as is permissible in view of the prior art.

What I claim as new and desire to secure by Letters Patent is:—

1. The process of preparing a beverage which consists in mashing an ungerminated vegetable substance containing translocation diastase and starch under conditions favoring the activity of the said diastase, drawing off the wort from the said mash, hopping the wort, and carbonating the hopped wort.

2. The process of producing a beverage which consists in preparing a mash devoid of germination diastase but including a carrier of translocation diastase, lactic acid bacteria, starch, and vegetable phosphates and proteids, mashing at a temperature above 40° C. for a period sufficient to cause a substantial inversion of the starch, drawing off and hopping the resultant wort, and carbonating the hopped wort.

3. The process of producing a beverage which consists in adding to ungerminated vegetable matter of the character of bran, water and lactic liquor of an acidity of about 2% and carrying active lactic acid bacteria, holding the mixture at a temperature favoring the activity of the said bacteria, adding gelatinized starch, raising the temperature to a point favoring the inversion of the starch, mashing at such elevated temperature until the starch has been substantially inverted, drawing off the wort, and hopping and carbonating the wort.

4. The process of producing a beverage which consists in adding to ungerminated vegetable matter of the character of bran, water, and lactic liquor of an acidity of about 2% and carrying active lactic acid bacteria, holding the mixture at a temperature favoring the activity of the said bacteria, adding gelatinized starch, raising the temperature to a point favoring the inversion of the starch, mashing at such elevated temperature, drawing off the wort from the mash, boiling the wort with the addition of hops and yeast cells, and filtering and carbonating the resultant product.

5. As a composition of matter, a hopped and carbonated alcohol-free beverage consisting of water, sugar, and the lactic-acid extracted substances of ungerminated cereal matter.

6. As a composition of matter, a hopped and carbonated alcohol-free beverage consisting of water, sugar, and the lactic acid extracted substances of wheat bran.

7. As a composition of matter, a hopped and carbonated alcohol-free beverage consisting of water, sugar, the soluble constituents of yeast cells, the lactic-acid extracted substances of ungerminated cereal matter, and coloring matter.

ROBERT WAHL.

In presence of—
O. C. AVL.US,
D. C. THORSEN.